United States Patent
Cideciyan et al.

(10) Patent No.: US 8,027,111 B2
(45) Date of Patent: Sep. 27, 2011

(54) WORD SYNCHRONIZATION FOR SERVO READ SIGNALS IN TAPE DRIVES

(75) Inventors: Roy Daron Cideciyan, Zurich (CH); Giovanni Cherubini, Zurich (CH); Evangelos S. Eleftheriou, Zurich (CH); Jens Jelitto, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 12/487,050

(22) Filed: Jun. 18, 2009

(65) Prior Publication Data

US 2009/0316773 A1    Dec. 24, 2009

(30) Foreign Application Priority Data

Jun. 18, 2008   (EP) .................................... 08104459

(51) Int. Cl.
G11B 20/10    (2006.01)
(52) U.S. Cl. ........................................................ 360/39
(58) Field of Classification Search ................... 360/39, 360/29, 32, 51, 77.12, 72.2, 73.12; 375/239
See application file for complete search history.

(56) References Cited

U.S. PATENT DOCUMENTS

| | | | | |
|---|---|---|---|---|
| 4,030,129 A * | 6/1977 | Whitlock | ......................... | 360/32 |
| RE30,482 E * | 1/1981 | Whitlock | ......................... | 360/32 |
| 4,402,021 A * | 8/1983 | Sonoda et al. | ............... | 360/72.2 |
| 5,577,044 A * | 11/1996 | Oxford | ......................... | 370/522 |
| 5,737,140 A | 4/1998 | Carr | | |
| 6,198,766 B1 | 3/2001 | Schuppe et al. | | |
| 6,446,236 B1 | 9/2002 | McEwen et al. | | |
| 6,757,117 B1 | 6/2004 | Livingston | | |
| 7,245,450 B1 | 7/2007 | Cherubini et al. | | |
| 7,764,460 B2 * | 7/2010 | Bates et al. | ................ | 360/77.12 |
| 7,881,008 B2 * | 2/2011 | Cherubini et al. | ......... | 360/77.12 |
| 7,903,360 B2 * | 3/2011 | Cherubini et al. | ............. | 360/51 |
| 2005/0030662 A1 | 2/2005 | Bui et al. | | |
| 2009/0219645 A1 * | 9/2009 | Bui et al. | ................... | 360/73.12 |

OTHER PUBLICATIONS

Scholtz, "Frame Synchronization Techniques", IEEE Transactions on Communications, vol. COM-28, No. 8, Aug. 1980, pp. 1204-1213.
Massey, "Optimum Frame Synchronization", IEEE Transactions on Communications, vol. COM-20, No. 2, Apr. 1972, pp. 115-119.
Nielsen, "Some Optimum and Suboptimum Frame Synchronizers for Binary Data in Gaussian Noise", IEEE Transactions on Communications, Jun. 1973, pp. 770-772.

(Continued)

*Primary Examiner* — Fred Tzeng
(74) *Attorney, Agent, or Firm* — Gail H. Zarick

(57) ABSTRACT

Methods and apparatus for detecting L-bit sync words occurring at N-bit intervals in PPM-encoded servo pattern read signals read in magnetic tape drives. A soft output detector processes the PPM-encoded servo pattern read signal to produce a series of soft output samples corresponding to respective bits encoded in the servo pattern. A sync word detector then produces block correlation values for respective positions of a sliding L-sample block in the series of soft output samples by (i) calculating at each block position bit correlation values indicating correlation between respective samples and corresponding bits of the sync word and (ii) summing each bit correlation value minus a predetermined function of the corresponding sample value. The sync word detector then detects a sync word at the block position with the maximum block correlation value in an (N+L−1)-sample sequence of the series of soft output samples.

15 Claims, 6 Drawing Sheets

OTHER PUBLICATIONS

Lui, et al., "Frame Synchronization for Gaussian Channels", IEEE Transactions on Communications, vol. COM-35, No. 8, Aug. 1987, pp. 818-829.

Barrett, et al., "Timing-Based Track-Following Servo for Linear Tape Systems", IEEE Transactions on Magnetics, vol. 34, No. 4, Jul. 1998, pp. 1872-1877.

Cherubini, et al., "Synchronous Servo Channel Design for Tape Drive Systems", ASME Information Storage and Processing Systems Conference, Jun. 2007, pp. 160-162.

Barker, "Group Synchronizing of Binary Digital Systems", Symposium on "Applications of Communicaton Theory", Instution of Electrical Engineers, Sep. 1952.

* cited by examiner

WORD SYNCHRONIZATION FOR SERVO READ SIGNALS IN TAPE DRIVES

CROSS REFERENCE TO RELATED APPLICATION

This application claims priority under 35 U.S.C. 119 from European Patent Application 08104459.6, filed Jun. 18, 2008, the entire contents of which are incorporated by reference.

BACKGROUND OF THE INVENTION

1. Field of the Invention

The present invention relates generally to word synchronization for servo read signals in tape storage systems. More particularly, methods and apparatus are provided for detecting sync words in pulse-position-modulation (PPM) encoded servo pattern read signals read from magnetic tape in tape drives.

2. Description of Related Art

In general, synchronous digital communication receivers include various types of synchronization subsystems such symbol synchronization and word synchronization (also known as frame synchronization) subsystems. Assuming symbol synchronization has already been achieved, the task of word synchronization consists of determining the position of the sync word within the received data stream.

Various techniques for word synchronization are described in "Frame synchronization techniques," R. A. Scholtz, IEEE Trans. on Communications, vol. 28, August 1980, pp. 1204-1213. In early work on word synchronization, the concept of the correlation decision rule was introduced (see R. H. Barker, "Group synchronization of binary digital systems," in Communication Theory, W. Jackson, Ed. London. Butterworth, 1953, pp. 273-287). According to this rule, bits in the received data stream are correlated with respective sync word bits and a sync word detected at the position of maximum correlation.

U.S. Pat. No. 5,073,906 employs a correlation technique for soft output samples in a mobile satellite communications receiver wherein samples are correlated with the sync word bits to produce a cross-correlation value which is compared with a threshold dependent on mean power for sync word detection.

An optimum word synchronization algorithm specifically for antipodal binary signals that are received in the presence of additive white Gaussian noise was proposed in "Optimum frame synchronization," J. L. Massey, IEEE Trans. on Commun., vol. 20, April 1972, pp. 115-119, (see also the Scholtz reference above). Specifically, the correlation decision rule for the optimum word synchronization algorithm for antipodal binary signals turns out to be the correlation decision rule modified by an additive correction term that depends on the signal-to-noise ratio (SNR). High-SNR and low-SNR approximations of the optimum word synchronization algorithm were also presented. Simulation results have demonstrated that the high-SNR approximation of the optimum word synchronization algorithm for antipodal binary signals performs almost as well as the optimum word synchronization algorithm (see "Some optimum and suboptimum frame synchronizers for binary data in Gaussian noise," P. T. Nielsen, IEEE Trans. on Communications, vol. 21, June 1973, pp. 770-772).

In "Frame Synchronization for Gaussian channels," G. L. Lui and H. H. Tan, IEEE Trans. on Communications, vol. 35, August 1987, pp. 818-829, the optimum word synchronization algorithm for antipodal binary signals in vector space was extended to both coherent and non-coherent phase demodulation on Gaussian channels assuming a maximum-likelihood one-shot receiver structure (see "Principles of Communication Engineering", J. M. Wozencraft and I. M. Jacobs, John Wiley & Sons, 1965).

In tape storage systems, timing-based servo (TBS) technology is employed for recording servo information in dedicated servo tracks extending longitudinally of the tape adjacent the data tracks. The LTO (Linear Tape Open) consortium adopted the TBS approach and standardized a robust, scalable, dedicated servo pattern for LTO tape drives which provides backward compatibility and remains unchanged in the follow-on LTO standards with higher track density. The TBS servo pattern is detailed in Standard ECMA-319, "Data interchange on 12.7 mm 384-track magnetic tape cartridges—Ultrium-1 format," June 2001, pp. 48 to 56.

The servo pattern consists of magnetic transitions defining a series of stripes with two different azimuthal slopes. The transverse position of the head can be derived from the relative timing of pulses generated by a narrow servo head reading the stripe pattern. TBS patterns also allow the encoding of additional longitudinal position (LPOS) information without affecting generation of the transverse position error signal (PES). The LPOS information is encoded by shifting transitions (stripes) in the servo pattern from their nominal pattern position in the longitudinal direction of the tape. LPOS information is recorded in 36-bit words over 36 frames of the servo pattern, each LPOS word indicating a specific, absolute longitudinal position on the tape. Each servo frame thus encodes one bit of LPOS information, the bit value being indicated by the particular shift in the servo pattern stripes.

The first 8 bits of a 36-bit LPOS word constitute a known synchronization word. Since the LPOS bits are recorded by shifting the longitudinal position of servo frame stripes, the resulting servo head read signal is a PPM-encoded signal in which the sync words must be identified for recovery of the position data.

Conventional synchronization systems in LTO drives apply the correlation decision rule to hard output bits derived from the PPM-encoded servo pattern read signal. Hard output bits are detected by a matched filter following interpolation of servo read signal samples as detailed in our U.S. Pat. No. 7,245,450 and "Synchronous Servo Channel Design for Tape Drive Systems," Cherubini et al., Proc. 17th Annual ASME Information Storage and Processing Systems Conf. ISPS 2007, Santa Clara University, CA, Jun. 18-19, 2007, pp. 160-162.

A sync word detector employed in conventional LTO tape drives is illustrated in FIG. 1 of the accompanying drawings. The stream of hard output bits $\hat{b}_k$, of value +1 or −1, is clocked through a series of seven delay elements D whose inputs/outputs supply a sliding block of eight bits $\hat{b}_k, \hat{b}_{k-1}, \ldots, \hat{b}_{k-7}$ to respective multipliers.

The known sync word bits $p_0, p_1, \ldots, p_7$ (where $p_0=1$ and $p_i=-1$ for $i=1, \ldots, 7$) are supplied to the other inputs of the multipliers as shown. The resulting bit correlation values are summed to produce a block correlation value $C_k$ at each position of the sliding 8-bit block in the output bit-stream. The block correlation values are supplied to a detector which outputs a word sync indicator when $C_k=8$, indicating a match between the current block and the expected sync word.

The robustness of the word synchronization operation in the presence of disturbances and noise is important for reliable operation of tape drives. Errors in reading back LPOS information and in the synchronization of LPOS words can generate false position information during normal drive servo operation. An improved word sync system for tape drives would therefore be desirable.

SUMMARY OF THE INVENTION

One aspect of the present invention provides word synchronization apparatus for detecting L-bit sync words occurring at N-bit intervals in a PPM-encoded servo pattern read signal read from magnetic tape in a tape drive. The apparatus includes: a soft output detector for processing the PPM-encoded servo pattern read signal to produce a series of soft output samples corresponding to respective bits encoded in the servo pattern; and a sync word detector for producing block correlation values for respective positions of a sliding L-sample block in the soft output sample series by calculating, at each block position, bit correlation values indicating correlation between respective samples and corresponding bits of the sync word, and summing each bit correlation value minus a predetermined function of the corresponding sample value; wherein the sync word detector is adapted to detect a sync word at the block position with the maximum block correlation value in an (N+L−1)-sample sequence of the soft output sample series.

A second aspect of the present invention provides a tape drive including: a read/write head for reading and writing data on magnetic tape; a servo reader associated with the read/write head for reading a PPM-encoded servo pattern on the magnetic tape to produce a servo pattern read signal; and servo controller for processing the servo pattern read signal to produce positional information for controlling relative positioning of the tape and read/write head; wherein the servo controller includes word synchronization apparatus according to the first aspect of the present invention.

A third aspect of the present invention provides a method for detecting L-bit sync words occurring at N-bit intervals in a PPM-encoded servo pattern read signal read from magnetic tape in a tape drive. The method includes: processing the PPM-encoded servo pattern read signal to produce a series of soft output samples corresponding to respective bits encoded in the servo pattern; producing block correlation values for respective positions of a sliding L-sample block in the soft output sample series by calculating, at each block position, bit correlation values indicating correlation between respective samples and corresponding bits of the sync word, and summing each bit correlation value minus a predetermined function of the corresponding sample value; and detecting a sync word at the block position with the maximum block correlation value in an (N+L−1)-sample sequence of the soft output sample series.

BRIEF DESCRIPTION OF THE DRAWINGS

Preferred embodiments of the present invention are described below, by way of example, with reference to the accompanying drawings in which.

DETAILED DESCRIPTION OF PREFERRED EMBODIMENTS

The conventional LTO system performs hard-decision word synchronization whereby sync words are detected from hard output bits (having values that have been decided as one of two possible values). The present invention departs from this convention, providing a soft-decision word synchronization system based on soft output samples, having values not yet resolved to one of two possible bit-values. A soft output detector is provided to generate the soft output samples from the PPM-encoded servo pattern read signal.

A sync word detector then performs a sliding-block correlation operation, correlating an L-sample block of soft output samples with the corresponding bits of the known L-bit sync word. However, rather than simply summing the bit correlation values, the sync word detector is adapted to subtract a function of the soft output sample value from the bit correlation value for each sample before summing the resulting values to produce a block correlation value. A sync word is then identified at the block position which maximizes the block correlation value in an (N+L−1)-sample sequence from the soft output detector (i.e. for N sequential positions of the L-sample block), where N is the sync word period in the PPM-encoded bit pattern.

Embodiments of the present invention offer significant improvements in error-rate performance compared to the conventional system. This leads to improved operating efficiency and will be especially advantageous at the high track densities that are envisaged to support multi-terabyte tape cartridges. Furthermore, current LTO tape head assemblies span a data band and two servo bands running either side of the data band. Thus, information from two separate servo heads is usually available to laterally position the data heads. If one of the servo heads is smeared or shorted, however, only one servo channel is available. Word sync systems embodying the present invention offer considerably improved performance in this circumstance. Embodiments of the present invention provide efficient and robust word synchronization systems which significantly outperform the legacy approach.

Particular forms of the predetermined function which can be used in calculating the block correlation values are detailed below. In addition, preferred embodiments offering especially efficient implementations are described. In particular, the construction of preferred soft output detectors generating particular forms of soft output for such systems is described in detail below.

Figure 2:
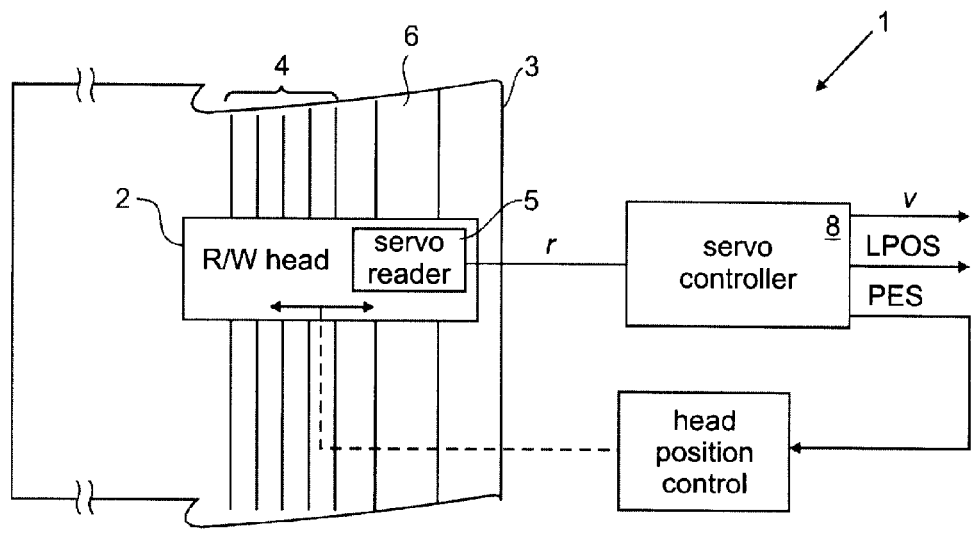
FIG. 2 is a schematic illustration of a tape drive in which word sync systems embodying the invention can be employed.

Referring to FIG. 2, a simplified schematic of a tape drive illustrating the main elements relevant to word synchronization systems embodying the present invention is shown. The tape drive 1 has a read/write head 2 for reading and writing data on magnetic tape 3. Specifically, the head 2 has a plurality of read/write elements (not shown) for reading and writing data in respective data tracks 4 as the tape 3 is conveyed past the head by a tape transport mechanism (not shown). A servo reader 5 is mounted on the head 2 for reading a servo pattern recorded in a dedicated servo band 6 adjacent the data tracks. In operation, the servo reader 5 outputs a servo pattern read signal r to a servo controller 8.

In practice, more than one servo reader may be provided on the head 2 reading respective servo bands 6 and providing read signals to servo controller 8. This offers increased robustness in provisioning the servo control functions (if the output of one of the servo readers is not reliable, it is possible to switch to the output of the other), but the operation of servo controller 8 can be understood by considering a single servo read signal r as illustrated. The servo controller 8 processes the read signal r to derive information for use in controlling relative movement of the tape 3 and head 2. In particular, an estimate of the tape velocity v is produced for use in the tape transport control system. The transverse position of the head 2 is estimated from the relative timing of pulses in the read signal, and a positional error signal (PES) is output to a positional control mechanism 9. This controls the transverse position of the head as indicated by the dotted line in the figure. In addition, longitudinal position (LPOS) information encoded in the servo pattern is extracted by servo controller 8 to determine the absolute position of the head 2 along the tape. The LPOS information is recorded in accordance with the LTO servo pattern specification as will now be explained with reference to FIGS. 3 and 4.

Figure 3:
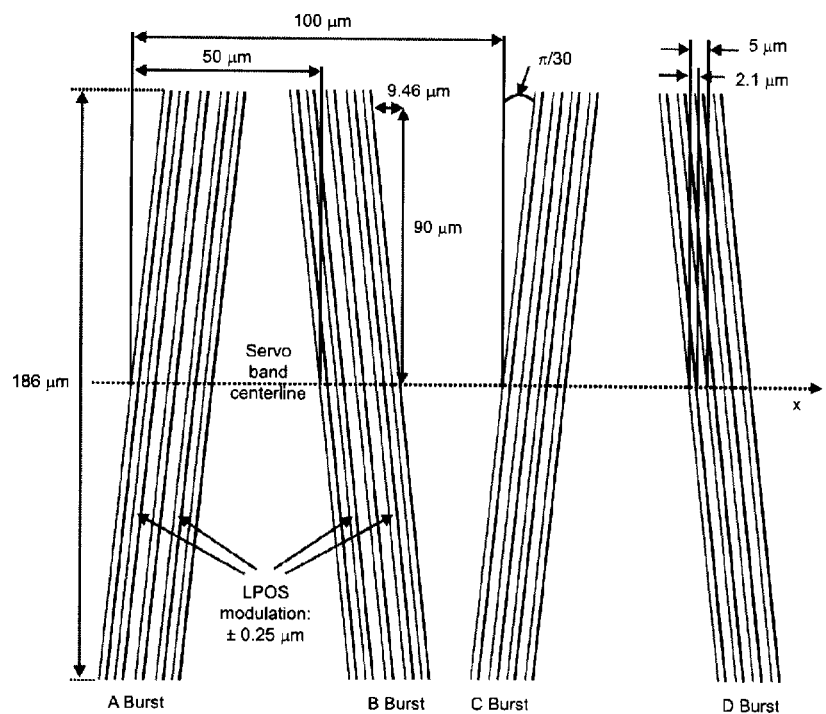
FIG. 3 illustrates the LTO specification of servo bursts forming a servo frame in which LPOS information can be encoded.

FIG. 3 depicts an LTO servo frame which corresponds to one 200-μm period of the LTO servo pattern. The LTO servo frame consists of four servo bursts labeled A, B, C and D. The A and B bursts have 5 servo stripes whereas the C and D bursts have 4 stripes. The servo stripes consist of two transitions in magnetization that are 2.1 μm apart and are written at an azimuth angle of ±π/30 radians (6 degrees). The servo stripes within a servo burst are spaced at a distance of 5 μm from each other. The positions of the second and the fourth servo stripes within the A and B bursts of a servo frame are modulated in order to encode one bit of LPOS information within a servo frame. The shift of the servo stripe position is ±0.25 μm.

Figure 4:
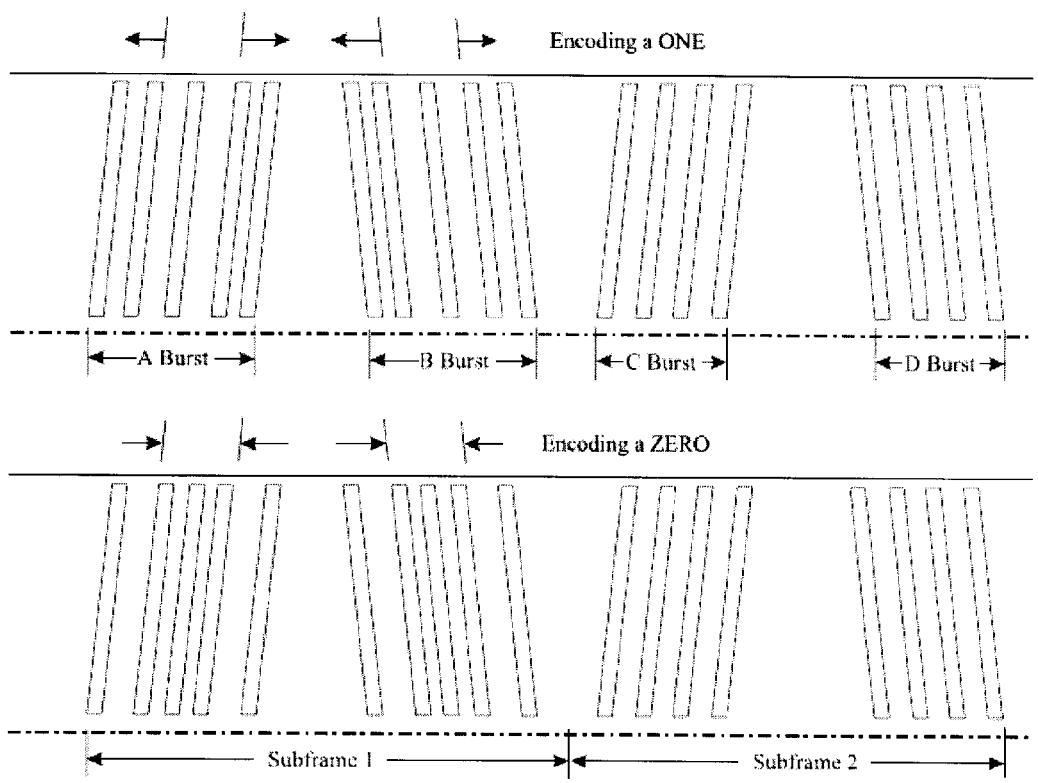
FIG. 4 shows how LPOS bits are encoded in the LTO servo frame.

FIG. 4 shows the encoding of one LPOS bit within an LTO servo frame consisting of subframe 1, which contains the A and B bursts, and subframe 2 which contains the C and D bursts. The upper section of the figure shows encoding of a "1" by shifting the second and fourth servo stripes outwardly from the centre stripe in each of the A and B bursts. The lower section of the figure shows encoding of a "0" by shifting the second and fourth servo stripes inwardly towards the centre stripe in the A and B bursts. The readback signals for these servo frames are thus PPM-encoded signals $s^1(t)$ and $s^0(t)$ representing the two LPOS bit values.

In LTO, the LPOS information is contained within an LPOS word which consists of 36 servo frames corresponding to a tape length of 7.2 mm. Each 36-bit LPOS word starts with a fixed 8-bit sync word followed by 24 bits of LPOS information and 4 bits of a manufacturing symbol. The LPOS information specifies an absolute longitudinal address on the tape. The fixed 8-bit sync word pattern is 10000000, where the symbol '1' is written first. Thus, sync words in the LTO servo band are periodically embedded into the LPOS data stream, the 8-bit sync word being repeated every 7.2 mm corresponding to the tape length of a 36-bit LPOS word. The LPOS values of two consecutive LPOS words differ by one. Therefore, an LTO tape drive 1 can position the read/write head 2 down tape 3 to a given LPOS with a longitudinal resolution of 7.2 mm. To do so, however, the LPOS information must first be extracted from the servo pattern read signal by servo controller 8. This requires word synchronization to detect the 8-bit LPOS sync words in the PPM-encoded read signal r. Servo controller 8 thus includes word synchronization apparatus for sync word detection, preferred embodiments of which is described hereinafter.

These embodiments perform word synchronization based on soft output detection of the PPM-encoded LPOS bits. Before describing the preferred embodiments in detail, it is useful to consider the following theoretical analysis on which the preferred embodiments are based.

A procedure is first described for generating soft outputs (soft decisions) for binary modulated signals in the presence of additive white Gaussian noise (AWGN). Consider the two signals $s^0(t)$ and $s^1(t)$, representing the LPOS bit values 0 and 1 respectively, whose pulse positions are modulated as described above depending on the LPOS bit value. It is assumed that both signals are nonzero for a time interval equal to at most T seconds in the interval (0, T) and have the same energy $$E_s = \int_0^T [s^0(t)]^2 dt = \int_0^T [s^1(t)]^2 dt.$$

The LPOS symbol stream can be represented by $$q(t) = \sum_{k=-\infty}^{\infty} [a_k s^1(t - kT + T) + (1 - a_k) s^0(t - kT - T)]$$

where $a_k$ is a stream of binary data bits taking values 0 or 1 that are independent and identically distributed. In the following the bipolar LPOS symbols are denoted by $$b_k = 2a_k - 1$$

and the additive white Gaussian noise model is used to characterize the reproduced signal by $$r(t) = q(t) + n(t)$$

where the one-sided spectral density of the additive noise process n(t) is flat and is given by $$N_0.$$

The detector for the received binary modulated signals is assumed to be a linear filter characterized by the impulse response g(t), $0 \leq t \leq T$, followed by a sampler providing a sample every T seconds. This type of detector is referred to herein as a type-1 detector. The soft output for the type-I detector, i.e., the sampled value at t=kT, can be characterized by $$x_k = x(kT) = \int_0^T g(\tau) r(kT - \tau) d\tau = \int_0^T g(\tau) q(kT - \tau) d\tau + \int_0^T g(\tau) n(kT - \tau) d\tau$$

where $$x(t) = \int_0^T g(\tau) r(t - \tau) d\tau = \int_{t-T}^{t} g(t - \tau) r(\tau) d\tau.$$

As n(t) is a Gaussian process, $x_k$ is a Gaussian random variable. In the following $x_k^0$ denotes the sample value when $s^0(t)$ is recorded during the bit interval and $x_k^1$ denotes the sample value when $s^1(t)$ is recorded during the bit interval. The mean values of the samples $x_k^0$ and $x_k^1$ are given by $$m^0 = E[x_k^0] = \int_0^T g(\tau) s^0(T - \tau) d\tau$$

$$m^1 = E[x_k^1] = \int_0^T g(\tau) s^1(T - \tau) d\tau$$

where E is the expectation operator. The standard deviation of the sample $x_k$ at the output of the detector filter, which does not depend on what signal was recorded, is given by $$\sigma = \sqrt{\frac{N_0}{2} \int_{-\infty}^{\infty} |G(f)|^2 df} = \sqrt{\frac{N_0}{2} \int_0^T g^2(t) dt}$$

where G(f) is the Fourier transform of g(t) and Parseval's theorem has been used to express the standard variation σ as a function of the impulse response g(t).

Assuming the bits $a_k$ are equally likely and $m_1 > m_0$, the decision rule of a maximum likelihood detector (as discussed in "Principles of Communication Engineering" referenced above) is $$x_k \leq \frac{m^0 + m^1}{2} \Rightarrow \hat{a}_k = 0$$
$$x_k > \frac{m^0 + m^1}{2} \Rightarrow \hat{a}_k = 1$$

where $\hat{a}_k$ is the hard decision at the detector output obtained by maximum-likelihood estimation of the recorded bit. The maximum-likelihood detector, which performs a threshold test to determine the value of the recorded bit, minimizes the average error rate of detected bits. In fact, the average bit error rate $P_b$ at the output of the maximum-likelihood detector is $$P_b = Q\left(\frac{|m^0 - m^1|}{2\sigma}\right)$$

where $$Q(x) = \frac{1}{\sqrt{2\pi}} \int_x^{\infty} e^{-u^2/2} du.$$

The average bit error rate $P_b$ at the output of the maximum-likelihood detector is minimized if the parameter $|m^0 - m^1|/2\sigma$ is maximized. Using the Schwartz inequality $|m^0 - m^1|/2\sigma$ is maximized if $$g(t) = c(s^1(T-t) - s^0(t-t)), 0 \leq t \leq T,$$

where c is an arbitrary constant.

In the following, $c = 1/\sqrt{2E_s(1-\phi)}$ is assumed where $$\varphi = \frac{1}{E_s} \int_0^T s^0(t) s^1(t) dt.$$

In this case, $$m^1 = -m^0 = \sqrt{E_s \frac{1-\varphi}{2}}$$

and $$\sigma = \sqrt{\sqrt{N_0/2}}.$$

The soft output from the detector in the absence of noise can then be expressed as $m_k = E[x_k|b_k] = b_k\sqrt{E_s(1-\phi)/2}$. Furthermore, the detection threshold is zero, i.e., $(m^0 + m^1)/2 = 0$, and the average LPOS bit error rate $P_b$ at the output of the maximum-likelihood detector becomes $$P_b = Q\left(\sqrt{\frac{(1-\varphi)E_s}{N_0}}\right).$$

The soft output of an alternative, type-2 detector for the received binary modulated signals can be characterized by $$y_k = y(kT) = \frac{c}{2} \int_0^T \left[ \begin{array}{c} (r(kT-\tau) - s^0(T-\tau))^2 - \\ (r(kT-\tau) - s^1(T-\tau))^2 \end{array} \right] d\tau$$

where $$y(t) = \frac{c}{2} \int_0^T [(r(t-\tau) - s^0(T-\tau))^2 - (r(t-\tau) - s^1(T-\tau))^2] d\tau$$
$$= \frac{c}{2} \int_{t-T}^t [(r(\tau) - s^0(\tau - (t-T)))^2 - (r(\tau) - s^1(\tau - (t-T)))^2] d\tau$$

It can readily be shown that type-1 and type-2 detectors have the same soft output, i.e., the type-1 soft output $x_k$ is identical with the type-2 soft output $y_k$ for all k.

The foregoing analysis considers soft-output detection of binary modulated signals in the presence of additive white Gaussian noise. Optimum soft-decision LPOS word synchronization using the generated soft outputs is addressed in the following.

Consider a block of N soft outputs $(x_0, x_1, \ldots, x_{N-1})$ obtained from a detector described in the previous section. From the analysis in the previous section, the soft outputs can be represented as the sum of a signal term and a noise term, i.e., $x_k = m_k + n_k$ where $m_k = b_k\sqrt{E_s(1-\phi)/2}$ on the data pattern or $m_k = p_k\sqrt{E_s(1-\phi)/2}$ on the sync pattern where the sync pattern where $p_k$ are bipolar sync symbols assuming the values +1 or −1, and $n_k$ are independent Gaussian noise samples with standard deviation $\sigma = \sqrt{N_0/2}$. The detected soft-output block corresponds to L sync word bits and (N−L) random binary data bits. In LTO as described above, N=36 and L=8, and the LPOS sync word is defined by $p_0 = 1$ and $p_i = -1$ for $i = 1, \ldots, 7$. Furthermore, the 28-bit binary data sequence in an LPOS word consists of seven 14-ary symbols where each 14-ary symbol is encoded into four bits using a specified one-to-one mapping. Here the sequence of LPOS data bits is modeled as a sequence of independent and identically distributed binary numbers with equal probabilities. This assumption allows the derivation of a simple optimum LPOS word synchronization algorithm and is justified because the 14-ary LPOS symbols are initially unknown.

Based on the approach described in the J. L. Massey reference mentioned above, which is in turn based on the mixed Bayes' rule, an optimum LPOS word synchronization algorithm is derived that maximizes the probability of correctly locating the LPOS sync word which is periodically imbedded into the LPOS data stream in the servo channel. For a detected block of soft outputs $(x_k, x_{k+1}, \ldots, x_{k-42})$ of length N+L−1=43 samples, the algorithm that estimates the best LPOS sync word location selects the LPOS sync word location l to be the value of n, $0 \leq n < 36$, which maximizes the statistic $$\sum_{i=0}^{7} p_i x_{k+i+n} - \sum_{i=0}^{7} h(x_{k+i+n})$$

where

-continued $$h(x) = \frac{\sqrt{E_s(1-\varphi)/2}}{SNR} \ln\left(\cosh\left(\frac{SNR}{\sqrt{E_s(1-\varphi)/2}}x\right)\right)$$

and the signal-to-noise ratio SNR is given by $$SNR = \frac{E_s(1-\varphi)}{N_0}.$$

The above word synchronization algorithm is of sliding-block type, as the best LPOS sync word location l is selected as the result of a sliding-block operation in conjunction with maximization of a well-defined statistic. This statistic can be described as the sum of a soft-correlation term and a second term that represents the effect of random data into which the 8-bit LPOS sync word is periodically imbedded. Note that this statistic depends on the SNR for LPOS detection in the servo channel. However, for large SNR the function h(x) can be approximated by $|x|$, which does not depend on SNR. This approximation allows much simpler implementation of the statistic for selecting the best LPOS sync word. The rule for determining the best LPOS sync word location simplifies in this case to maximizing the statistic $$\sum_{i=0}^{7} p_i x_{k+i+n} - \sum_{i=0}^{7} |x_{k+i+n}| = -2\sum_{i \in N} |x_{k+i+n}|$$

where the last summation is over the set of indices $N=\{i|0\leq i\leq 7 \text{ and } p_i x_{k+i+n}<0\}$. In other words, the rule for determining the best LPOS sync word location simplifies to minimizing the sum of negatively correlated terms, i.e., $$\sum_{i \in N} |x_{k+i+n}| = \sum_{i \in N} \left| \int_0^T g(\tau)r((k+i+n)T-\tau)d\tau \right|.$$

In the derivation of the optimum soft-decision LPOS word synchronization algorithms discussed so far it was assumed that the signals $s^0(t)$ and $s^1(t)$ are nonzero during at most T seconds in the time interval (0, T). In longitudinal recording, these signals can be modeled as the superposition of several narrow pulses. Specifically, in the case of LPOS detection the response to four position-modulated servo stripes results in the superposition of eight pulses to yield the signals $s^0(t)$ and $s^1(t)$. In the following approach the support of the signals $s^0(t)$ and $s^1(t)$ is extended from (0,T) to the whole real line. (The support of a function f(.) in mathematics is the set of points where the function is not zero). Clearly, the LPOS word synchronization algorithms discussed so far perform well if most of the energy of the signals $s^0(t)$ and $s^1(t)$ is located in the interval (0,T), i.e., $$\int_0^T [s^i(t)]^2 dt \gg (\int_{-\infty}^{0}[s^i(t)]^2 dt + \int_T^{\infty}[s^i(t)]^2 dt).$$

In LTO, the above assumption is justified because the minimum transition distance is only 2.1 μm, which is much smaller than the LTO servo frame length of 200 μm on tape, corresponding to a time interval T.

In a particularly advantageous approach, the convolution integral in the statistic that is to be minimized is approximated by a sum and non-significant terms in this sum are dropped. This allows an especially simple and robust implementation of the LPOS word synchronization algorithm with digital logic. In this case, the statistic $$\sum_{i \in N} \left| \int_0^T g(\tau) r\binom{(k+i+n)}{T-\tau} d\tau \right| = \sum_{i \in N} \left| \int_{(k+i+n-1)T}^{(k+i+n)T} g\binom{(k+i+n)}{T-\tau} r(\tau)d\tau \right|$$

can be approximated up to a multiplicative constant by the statistic $$\sum_{i \in N} \left| \sum_{j \in J} \tilde{r}_j (\tilde{s}_j^0 - \tilde{s}_j^1) \right|$$

where J is the set of indices and $\tilde{s}_j^0 = s^0(t=jT'-(k+i+n-1)T),$ $\tilde{s}_j^1 = s^1(t=jT'-(k+i+n-1)T),$ $\tilde{r}_j = r(t=jT')$ For a tape velocity v the modulated signal samples $\tilde{s}_j^0, \tilde{s}_j^1$ and the received samples $\tilde{r}_j$ are spaced much closer to each other than T=200 μm v, i.e., T'<<T. For example, a spacing of T'=0.25 μm v is a good choice for the LTO servo signal because the rate 1/T' is greater than the two-sided bandwidth of the servo signal, ensuring that the received signal can be reconstructed from its samples $\tilde{r}_j$ without loss of information, as required by the sampling theorem. In a further simplification which recognizes that only a few terms in the approximate statistic contribute significantly to the sum, the statistic can be efficiently computed by taking the sum over a subset $J' \subseteq J$ of indices j, i.e., the statistic to be minimized becomes $$\sum_{i \in N} \left| \sum_{j \in J'} \tilde{r}_j (\tilde{s}_j^0 - \tilde{s}_j^1) \right|.$$

In the case of the type-2 detector defined earlier the statistic to be minimized is $$\sum_{i \in N} \left| \int_{(k+i+n-1)}^{(k+i+n)T} \begin{bmatrix} (r(\tau)-s^0(\tau-(k+i+n-1)T))^2 - \\ (r(\tau)-s^1(\tau-(k+i+n-1)T))^2 \end{bmatrix} d\tau \right|.$$

In this case also, the integral in the statistic can be advantageously approximated by a sum and non-significant terms in this sum can be dropped in order to obtain an efficient and robust implementation of the soft-decision LPOS word synchronization algorithm. The resulting statistic that is to be minimized is then given by $$\sum_{i \in N} \left| \sum_{j \in J'} \left[ (\tilde{r}_j - \tilde{s}_j^0)^2 - (\tilde{r}_j - \tilde{s}_j^1)^2 \right] \right|.$$

Figure 5:
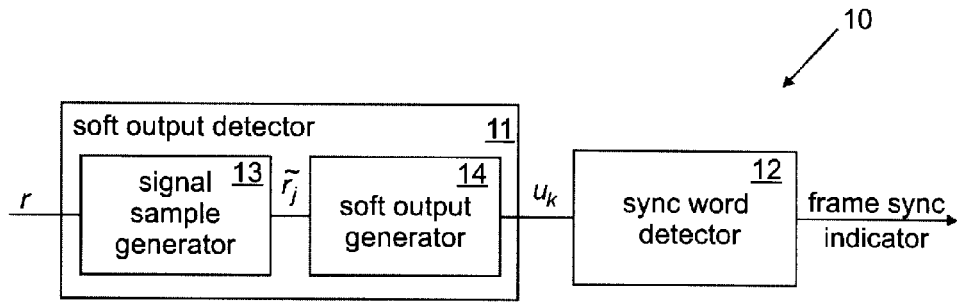
FIG. 5 is a schematic block diagram of word synchronization apparatus in the tape drive of FIG. 2.

Preferred embodiments of word synchronization apparatus based on the foregoing analysis are described with reference to FIGS. 5 to 9. The block diagram of FIG. 5 illustrates the general form of word sync apparatus 10 for use in servo controller 8 in the FIG. 2 tape drive. The apparatus 10 includes a soft output detector 11 and a sync word detector 12. The soft output detector 11 includes a signal sample generator 13 and a soft output generator 14. Briefly, the signal sample generator 13 receives the continuous-time read signal r from servo reader 5 (FIG. 2) and generates a set of interpolated signal samples $\tilde{r}_j$ Corresponding to each encoded LPOS bit-period T. Soft output generator 14 process the interpolated samples $\tilde{r}_j$ to generate a soft output sample $u_k$ corresponding to the encoded LPOS bit. The series of soft output samples ... $u_{k-1}$, $u_k$, $u_{k+1}$, ... is supplied to sync word detector 12 which operates as detailed below to detect a sync word in the sample stream, outputting a frame sync indicator signal when a sync word is detected.

Figure 6:
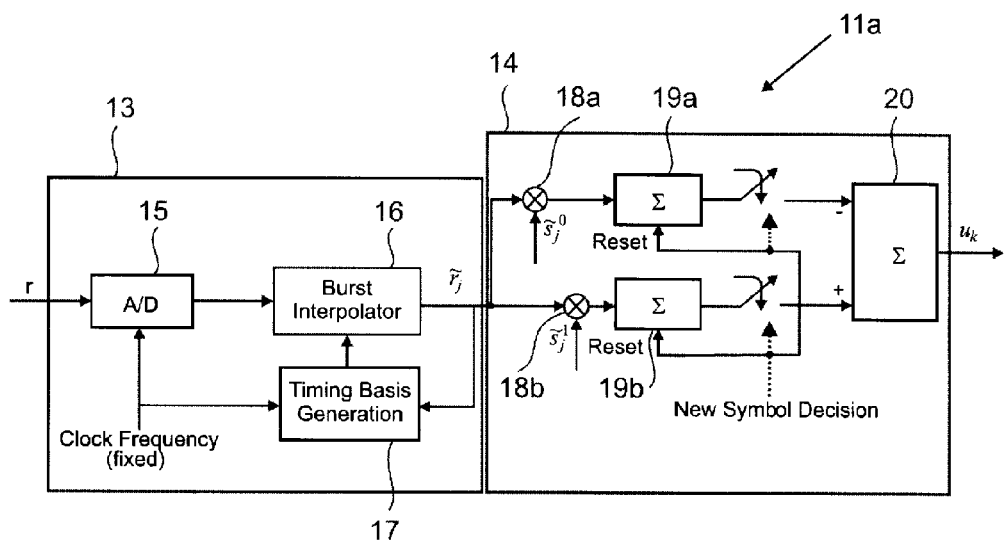
FIG. 6 shows one embodiment of a soft output detector of the FIG. 5 apparatus.

A preferred embodiment of a soft output detector for use as detector 11 in FIG. 5 is illustrated in more detail in FIG. 6. The soft output detector 11a of this embodiment includes a signal sample generator 13 and a soft output generator 14a whose structure is illustrated in detail in the figure. The signal sample generator 13 includes a sampler (A/D) 15, a burst interpolator 16 and a timing basis generation circuit 17. In operation, sampler 15 samples the read signal r at a fixed sampling frequency, and the resulting samples are supplied to burst interpolator 16. The burst interpolator operates to interpolate the fixed-frequency samples of the servo frame bursts in the servo pattern read signal to generate the signal samples $\tilde{r}_j$ corresponding to timings determined by timing basis circuit 17.

These timings are determined such that the samples $\tilde{r}_j$ are produced at a fixed rate per unit length of tape. The burst interpolator 16 and timing basis circuit 17 can be implemented as described in detail in our U.S. Pat. No. 7,245,450 and the Cherubini et al. reference mentioned above. The key point is that the samples $\tilde{r}_j$ are obtained at a predetermined fixed rate which is independent of tape velocity, the rate being defined in terms of samples per unit tape-length. The resolution of the servo channel signal at the interpolator output is thus determined by the step interpolation distance $\Delta x$, which is the minimum distance between samples at the interpolator output. Reliable LPOS detection can be achieved during ramp-up, ramp-down, and for any constant tape velocity up to a maximum velocity $v_{max}$. Assuming the one-sided bandwidth of the PPM servo signal at the input of the sampler 15 is twice the width of the main lobe of the spectrum of the non-modulated servo signal, i.e., $W=2v_{max}/L_p$, where $L_p$ is the minimum distance between transitions in magnetization, the sampling theorem provides an approximate lower bound on the sampling rate $f_s$ of the sampler 15 as $$f_s \geq 2W = \frac{4v_{max}}{L_p}.$$

This choice of the sampling rate $f_s$ renders aliasing effects negligible. Consequently, an approximate upper bound on the step interpolation distance $\Delta x$ at the output of the burst interpolator 16 is $\Delta x \leq L_p/4$. For example, for $L_p=2.1$ μm as specified in LTO, the step interpolation distance is bounded by $\Delta x \leq 0.525$ μm.

The resulting set of interpolated signal samples $\tilde{r}_j$ is supplied to soft output generator 14a. This includes multipliers 18a, 18b and sum circuits 19a, 19b and 20 connected as shown in the figure. In operation, the interpolated samples $\tilde{r}_j$ are supplied to first inputs of the two multipliers 18a, 18b. The other inputs of multipliers 18a, 18b respectively receive samples $\tilde{s}_j^0$ and $\tilde{s}_j^1$ of the PPM encoded signals $s^0(t)$ and $s^1(t)$ which represent the bit values 0 and 1 encoded in the servo pattern. The set of samples $\tilde{s}_j^0$ and $\tilde{s}_j^1$ are taken at sample timings corresponding to those of the corresponding interpolated samples $\tilde{r}_j$, and can be generated in advance for the known reference signals $s^0(t)$ and $s^1(t)$.

As the samples $\tilde{r}_j$ are clocked through multipliers 18a, 18b, the multiplication outputs are supplied to respective sum circuits 19a, 19b. These sum the inputs over the set of indices J, j∈J. After every J inputs, a reset signal clocks the current summation values from circuits 19a and 19b into sum circuit 20 and resets the sum values to zero. Circuit 20 subtracts the output of sum circuit 19a from that of sum circuit 19b to produce the current soft output sample $u_k$.

It will be seen that the soft output generator 14a of this embodiment processes the signal $r_{j\in J}$ to generate a soft output sample $u_k$ of the form $$u_k \propto \sum \tilde{r}_j(\tilde{s}_j^0 - \tilde{s}_j^1)$$

where the constant of proportionality is unity in this case. In a further simplification of the embodiment, the summation in circuits 19a and 19b can be taken over the most significant terms only, i.e. over a subset J' of the indices set J, as discussed in the analysis given earlier. For example, for a typical value of the size of the set J given by |J|=2000=200 μm/100 nm, where a step interpolation distance of $\Delta x=100$ nm and a servo frame length of 200 μm have been assumed, the summation might be taken over a subset J' with |J'|=16 terms only. This is because every dibit response (read-back servo signal corresponding to a servo stripe) can be represented by 4 samples (2 samples for the positive pulse in a dibit response and 2 samples for the negative pulse in a dibit response) and therefore only 16 terms in the summation can be used to characterize four dibits (read-back servo signal corresponding to four PPM-modulated servo stripes per servo frame) whose positions within a servo frame are modulated (see FIG. 4). Thus it will be seen that soft output $u_k$ of detector 14a approximates the type-1 soft output $x_k$ discussed in the earlier analysis up to a scaling factor.

Figure 7:
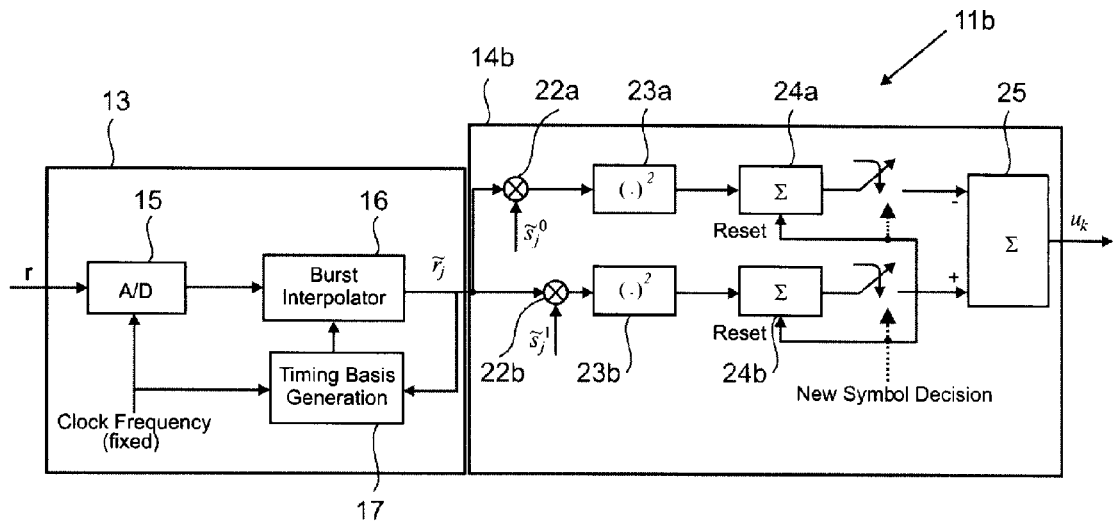
FIG. 7 shows another embodiment of a soft output detector of the FIG. 5 apparatus.

An alternative preferred embodiment of a soft output detector for use in the FIG. 5 apparatus is illustrated in FIG. 7. The soft output detector 11b of this embodiment includes a signal sample generator 13 as described above for FIG. 6, and an alternative soft output generator 14b. The soft output generator 14b includes similar components to generator 14a, and only the key differences are described here. In particular, in generator 14b the multipliers 18a, 18b are replaced by adders 22a, 22b followed by squaring circuits 23a, 23b as indicated. For each interpolated input sample $\tilde{r}_j$, the output of squaring circuit 23a is $$(\tilde{r}_j - \tilde{s}_j^0)^2.$$

Similarly, the output of squaring circuit 23b is $(\tilde{r}_j - \tilde{s}_j^1)^2$. These outputs are summed over the set of indices J by summation circuits 24a, 24b and the resulting sums supplied to respective inputs of sum circuit 25. This subtracts the lower from the upper input to generate the soft output sample $u_k$. It will be seen that this soft output generator 14b processes the signal $r_{j\in J}$ to generate a soft output sample $u_k$ of the form $$u \propto \Sigma \lfloor (\tilde{r}_j - \tilde{s}_j^0)^2 - (\tilde{r}_j - \tilde{s}_j^1)^2 \rfloor$$

where the constant of proportionality is unity here. However, as before, the summation in circuits 24a and 24b can be taken over the J' most significant terms only. Thus it will be seen that the soft output $u_k$ of detector 14b approximates the type-2 soft output $y_k$ discussed in the earlier analysis up to a scaling factor.

Figure 8:
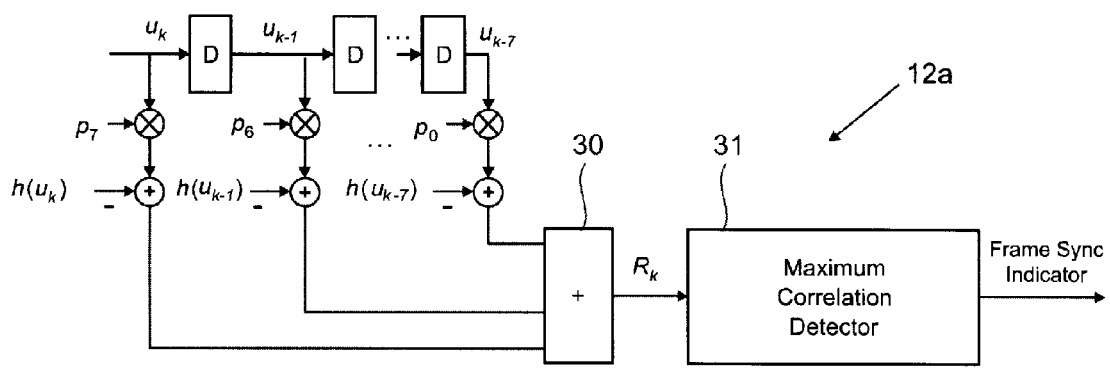
FIG. 8 shows one embodiment of a sync word detector of the FIG. 5 apparatus.

FIG. 8 shows a first embodiment of a sync word detector for use in the apparatus of FIG. 5. The detector 12a of this embodiment has seven delay elements D having inputs/outputs connected to respective multipliers as indicated in the figure. The series of soft output samples $u_k$ produced by the soft output detector 11 as described above is clocked though the delay elements so that a sliding block of eight samples is supplied to the multiplier inputs. The other inputs of these multipliers receive the known sync word bits $p_0, p_1, \ldots, p_7$ (where $p_0=1$ and $p_i=-1$ for $i=1, \ldots, 7$) as shown. The output of each multiplier is thus a bit correlation value indicating correlation between one of the eight soft samples of the current block and the corresponding sync word bit. Each bit correlation value is supplied to one input of a respective adder. A predetermined function h of the associated soft sample value is supplied to the other input of each adder which subtracts the function from the bit correlation value. The resulting values from all eight adders are then summed in adder 30 to produce a block correlation value $R_k$ for the current block position in the soft output sample stream. The block correlation values $R_k$ are output to a maximum correlation detector 31. This detects the block position with the maximum block correlation value $R_k$ in an $(N+L-1)=36+8-1=43$-sample sequence from the soft output detector. That is, the correlation detector identifies the location $n=1$, $0 \leq n < N=36$, in the sequence of $N=36$ block positions at which the value $R_k$ is maximum. The output of correlation detector 31 is a frame sync signal indicating the identified value of 1.

In this embodiment of the word sync detector, the predetermined function $h(u_k)$ is given by $$h(u_k) = \frac{\sqrt{E_s(1-\varphi)/2}}{SNR} \ln\left(\cosh\left(\frac{SNR}{\sqrt{E_s(1-\varphi)/2}} u_k\right)\right)$$

where $E_s$, $\varphi$ and SNR are as defined in the earlier analysis. Thus, $E_s$ is the energy of PPM-encoded signals $s^0(t)$ and $s^1(t)$, $$\varphi = \frac{1}{E_s} \int_0^T s^0(t) s^1(t) dt$$

and the signal-to-noise ratio SNR is $$SNR = \frac{E_s(1-\varphi)}{N_0}$$

where $N_0$ is the one-sided spectral density of the noise process in the servo channel. It will be seen that the effect of word sync detector 12a is to indicate acquisition of frame synchronization at the location in the soft output sample stream which maximizes statistic $$R_k = \sum_{i=0}^{7} p_i u_{k+i+n} - \sum_{i=0}^{7} h(u_{k+i+n}).$$

Figure 9:
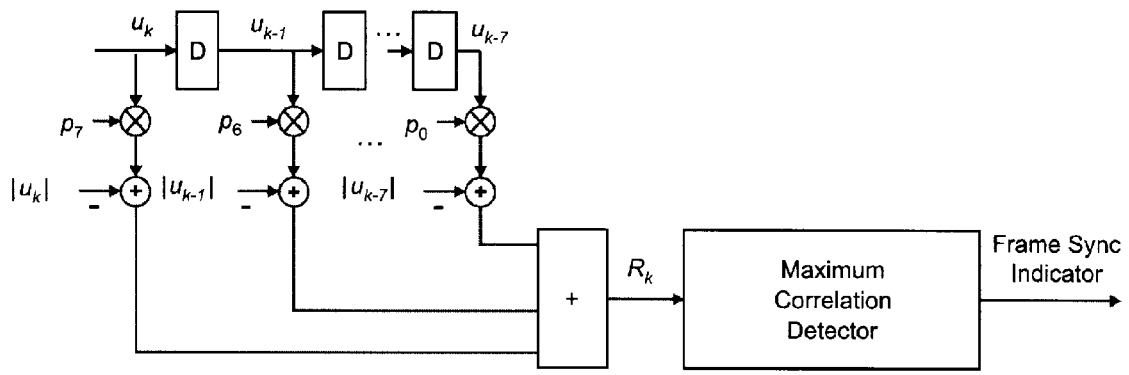
FIG. 9 shows another embodiment of a sync word detector of the FIG. 5 apparatus.

In a preferred implementation of the word sync detector 12, the predetermined function h is simplified, and in particular is independent of SNR in the servo channel. The preferred word sync detector 12b is illustrated in FIG. 9. This corresponds generally to FIG. 8, like elements being labeled accordingly, and only the key differences are described here. In particular, the function $h(u_k)$ is the modulus of the soft output sample value $|h(u_k)|$. In this embodiment therefore, frame synchronization is indicated at the location in the soft output sample stream which maximizes the statistic $$R_k = \sum_{i=0}^{7} p_i u_{k+i+n} - \sum_{i=0}^{7} |h(u_{k+i+n})|.$$

Figure 1:
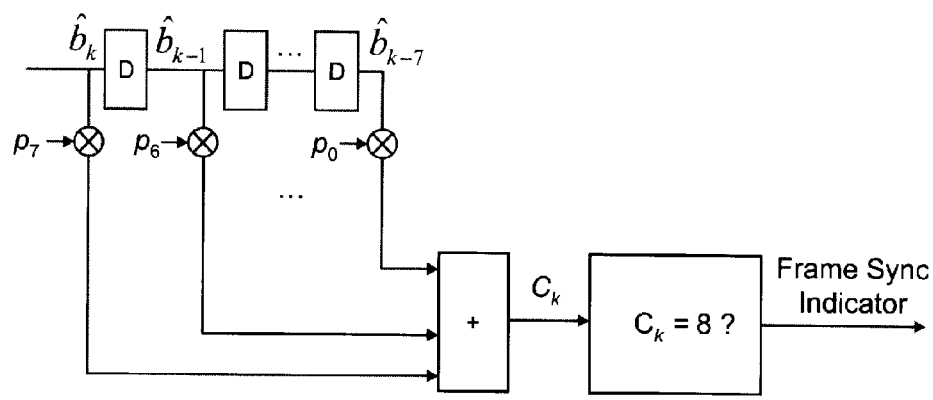
FIG. 1 shows the hard-decision sync word detector employed in conventional LTO tape drives.
Figure 10:
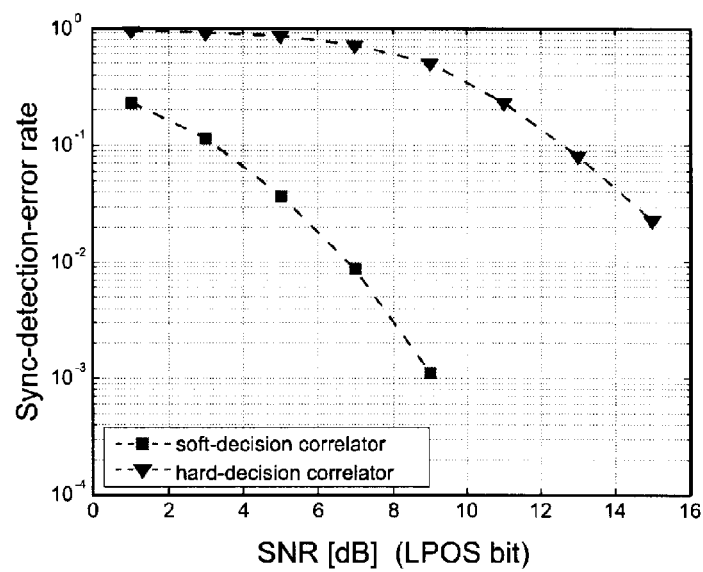
FIGS. 10 and 11 are graphs comparing simulation results for the conventional word sync system and a preferred embodiment of the invention.

The word synchronization apparatus described above, which is based soft-output detection of continuous-time PPM-encoded LTO servo signals, offers simple, efficient and robust implementations for word synchronization systems in tape drives. Moreover, simulation results demonstrate that the proposed apparatus significantly outperforms the legacy LPOS word synchronization technique. In particular, the servo channel generating soft decisions for LPOS detection has been simulated in the presence of additive white Gaussian noise in order to assess robustness compared to the legacy approach. FIG. 10 illustrates the results for ideal timing recovery. The curve corresponding to the legacy hard-decision correlator was obtained by employing hard LPOS decisions as shown in FIG. 1 and the legacy hard-decision LPOS word synchronization system of U.S. Pat. No. 7,245,450. The curve for the soft-decision correlator was obtained by employing the soft output detector of FIG. 6 and the sync word detector of FIG. 9.

Figure 11:
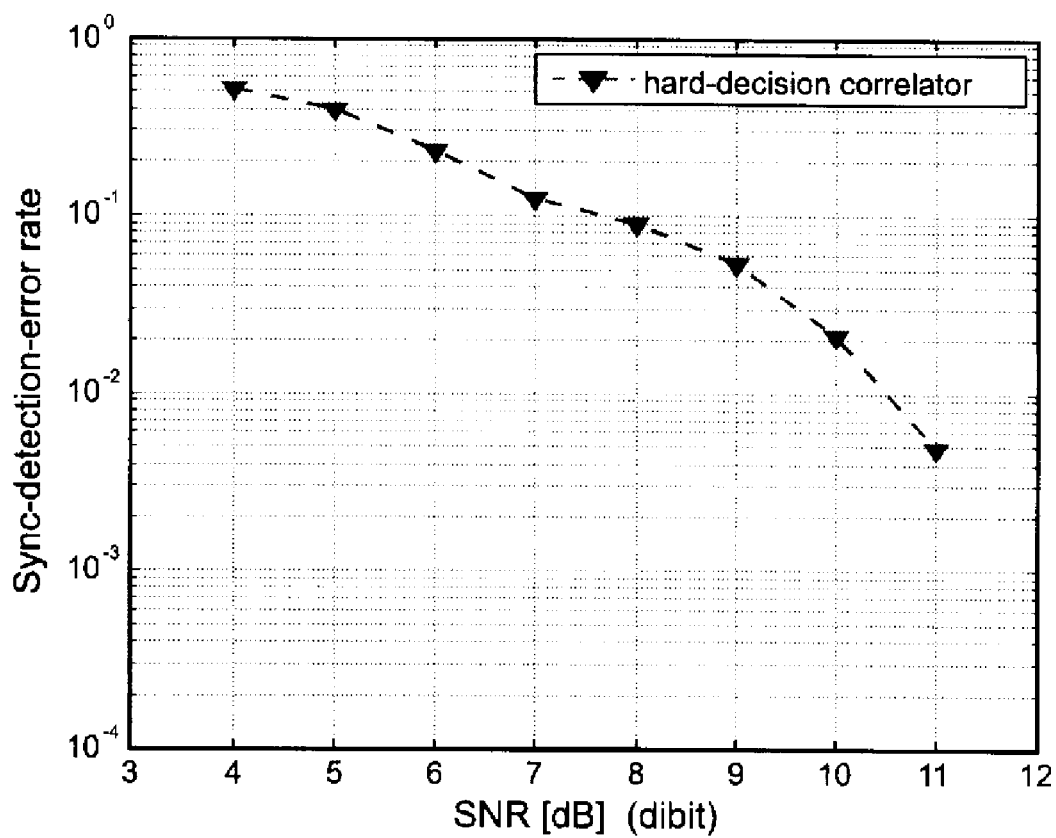

The results demonstrate that the word sync apparatus embodying the present invention is about 9 dB more robust than the legacy hard-decision system for a sync-detection-error rate of $10^{-2}$. Note that at lower sync-detection-error rates the gain provided by the word sync apparatus embodying the present invention is larger than 9 dB. Moreover, FIG. 11 depicts simulation results for a practical non-ideal timing recovery scheme. The curve corresponding to the word sync apparatus embodying the present invention is missing because no frame sync errors were observed in this case.

It will of course be appreciated that many changes and modifications can be made to the exemplary embodiments described without departing from the scope of the present invention. For example, while operation of the embodiments has been described with particular reference to LTO servo patterns, the present invention can of course be applied to other PPM-encoded servo patterns.

We claim:

1. A word synchronization apparatus for detecting L-bit sync words occurring at N-bit intervals in a pulse-position-modulation encoded (PPM-encoded) servo pattern read signal read from magnetic tape in a tape drive, the apparatus comprising:
  a soft output detector for processing the PPM-encoded servo pattern read signal to produce a series of soft output samples corresponding to respective bits encoded in the servo pattern; and
  a sync word detector for producing block correlation values for respective positions of a sliding L-sample block in the series of soft output samples by calculating, at each block position, bit correlation values indicating correlation between respective samples and corresponding bits of the sync word, and summing each bit correlation value minus a predetermined function of the corresponding sample value;

wherein the sync word detector is adapted to detect a sync word at the block position with the maximum block correlation value in an (N+L−1)-sample sequence of the series of soft output samples.

2. Apparatus as claimed in claim 1 wherein said predetermined function comprises a function h(u) defined by:

$$h(u) = \frac{\sqrt{E_s(1-\varphi)/2}}{SNR} \ln\left(\cosh\left(\frac{SNR}{\sqrt{E_s(1-\varphi)/2}} u\right)\right)$$

where:
u is the soft output sample value;
$E_s$ is the energy of PPM-encoded signals $s^0(t)$ and $s^1(t)$ representing respective bit values encoded in the servo pattern;
φ is defined by:

$$\varphi = \frac{1}{E_s} \int_0^T s^0(t) s^1(t) dt$$

wherein T is the encoded bit period; and
SNR is a signal-to-noise ratio for the read signal.

3. Apparatus as claimed in claim 1 wherein said predetermined function comprises the modulus of the soft output sample value.

4. Apparatus as claimed in claim 1 wherein the soft output detector comprises:
a signal sample generator for generating a set of signal samples $r_{j \chi J}$ of the servo pattern read signal for an encoded bit period T, where J is a set of indices; and
a soft output generator for generating from the signal samples $r_{j \chi J}$ a soft output sample u of the form:

u ∝ $\Sigma r_j(s_j^0 - s_j^1)$ where $s^0_j$ and $s^1_j$ are samples of PPM-encoded signals representing respective bit values encoded in the servo pattern and taken at sample timings corresponding to the associated signal samples $r_j$, and where the summation is over at least a subset of the set of indices J.

5. Apparatus as claimed in claim 4 wherein said summation is over a subset of the set of indices J.

6. Apparatus as claimed in claim 4 wherein the signal sample generator comprises a sampler for sampling the read signal at a fixed sampling frequency, and an interpolator for interpolating the fixed-frequency samples to generate said signal samples $r_{j \chi J}$ at a fixed rate per unit length of tape.

7. Apparatus as claimed in claim 6, the apparatus being adapted to process a TBS servo pattern read signal to detect PPM-encoded LPOS sync words.

8. Apparatus as claimed in claim 1 wherein the soft output detector comprises:
a signal sample generator for generating a set of signal samples $r_{j \chi J}$ of the servo pattern read signal for an encoded bit period T, where J is a set of indices; and
a soft output generator for generating from the signal samples $r_{j \chi J}$ a soft output sample u of the form:

u ∝ $\Sigma [(r_j - s_j^0)^2 - (r_j - s_j^1)^2]$ where $s^0_j$ and $s^1_j$ are samples of PPM-encoded signals representing respective bit values encoded in the servo pattern and taken at sample timings corresponding to the associated signal samples $r_j$, and where the summation is over at least a subset of the set of indices J.

9. A tape drive, comprising:
a read/write head for reading and writing data on magnetic tape;
a servo reader associated with the read/write head for reading a PPM-encoded servo pattern on the magnetic tape to produce a servo pattern read signal; and
a servo controller for processing the servo pattern read signal to produce positional information for controlling relative positioning of the tape and read/write head;
wherein the servo controller includes:
a soft output detector for processing the PPM-encoded servo pattern read signal to produce a series of soft output samples corresponding to respective bits encoded in the servo pattern; and
a sync word detector for producing block correlation values for respective positions of a sliding L-sample block in the series of soft output samples by calculating, at each block position, bit correlation values indicating correlation between respective samples and corresponding bits of the sync word, and summing each bit correlation value minus a predetermined function of the corresponding sample value; said sync word detector being adapted to detect a sync word at the block position with the maximum block correlation value in an (N+L−1)-sample sequence of the series of soft output samples.

10. A method for detecting L-bit sync words occurring at N-bit intervals in a PPM-encoded servo pattern read signal read from magnetic tape in a tape drive, the method comprising the steps of:
processing the PPM-encoded servo pattern read signal to produce a series of soft output samples corresponding to respective bits encoded in the servo pattern;
calculating bit correlation values at each block position indicating correlation between respective samples and corresponding bits of the sync word;
summing each bit correlation value minus a predetermined function of the corresponding sample value to produce block correlation values for respective positions of a sliding L-sample block in the series of soft output samples; and
detecting a sync word at the block position with the maximum block correlation value in an (N+L−1)-sample sequence of the series of soft output samples.

11. A method as claimed in claim 10 wherein said predetermined function comprises a function h(u) defined by:

$$h(u) = \frac{\sqrt{E_s(1-\varphi)/2}}{SNR} \ln\left(\cosh\left(\frac{SNR}{\sqrt{E_s(1-\varphi)/2}} u\right)\right)$$

wherein:
u is the soft output sample value;
$E_s$ is the energy of PPM-encoded signals $s^0(t)$ and $s^1(t)$ representing respective bit values encoded in the servo pattern; and φ is defined by:

$$\varphi = \frac{1}{E_s} \int_0^T s^0(t) s^1(t) dt$$

wherein T is the encoded bit period; and
SNR is a signal-to-noise ratio for the read signal.

12. A method as claimed in claim 10 wherein said predetermined function comprises the modulus of the soft output sample value.

13. A method as claimed in claim 10 wherein the soft output samples are produced by the steps of:
generating a set of signal samples $r_{j \times J}$ of the servo pattern read signal for an encoded bit period T, where J is a set of indices; and
generating from the signal samples $r_{j \times J}$ a soft output sample u of the form:

$$u \propto \Sigma r_j (s_j^0 - s_j^1)$$

where $s^0_j$ and $s^1_j$ are samples of PPM-encoded signals representing respective bit values encoded in the servo pattern and taken at sample timings corresponding to the associated signal samples $r_j$, and where the summation is over at least a subset of the set of indices J.

14. A method as claimed in claim 13 wherein said signal samples are generated by: sampling the read signal at a fixed sampling frequency and interpolating the fixed-frequency samples to generate said signal samples $r_{j \times J}$ at a fixed rate per unit length of tape.

15. A method as claimed in claim 10 wherein the soft output samples are produced by the steps of:
generating a set of signal samples $r_{j \times J}$ of the servo pattern read signal for an encoded bit period T, where J is a set of indices; and
generating from the signal samples $r_{j \times J}$ a soft output sample u of the form:

$$u \propto \Sigma [(r_j - s_j^0)^2 - (r_j - s_j^1)^2]$$

where $s^0_j$ and $s^1_j$ are samples of PPM-encoded signals representing respective bit values encoded in the servo pattern and taken at sample timings corresponding to the associated signal samples $r_j$, and where the summation is over at least a subset of the set of indices J.

* * * * *